(12) United States Patent
Minotti et al.

(10) Patent No.: US 9,882,510 B2
(45) Date of Patent: Jan. 30, 2018

(54) PASSIVE INDEXING OF A MOVABLE ELEMENT HAVING TEETH

(71) Applicant: SILMACH, Besancon (FR)

(72) Inventors: Patrice Minotti, Gennes (FR); Gilles Bourbon, Besancon (FR); Patrice Le Moal, Besancon (FR)

(73) Assignee: SILMACH, Besancon (FR)

( * ) Notice: Subject to any disclaimer, the term of this patent is extended or adjusted under 35 U.S.C. 154(b) by 522 days.

(21) Appl. No.: 14/371,726

(22) PCT Filed: Jan. 11, 2013

(86) PCT No.: PCT/EP2013/050442
§ 371 (c)(1),
(2) Date: Jul. 10, 2014

(87) PCT Pub. No.: WO2013/104738
PCT Pub. Date: Jul. 18, 2013

(65) Prior Publication Data
US 2015/0022053 A1    Jan. 22, 2015

(30) Foreign Application Priority Data
Jan. 12, 2012   (FR) ..................................... 12 50320

(51) Int. Cl.
*H02N 1/00* (2006.01)
*H02N 2/00* (2006.01)
(Continued)

(52) U.S. Cl.
CPC ........... *H02N 1/008* (2013.01); *F16H 31/007* (2013.01); *G06M 1/04* (2013.01); *G04C 3/00* (2013.01)

(58) Field of Classification Search
CPC ................................... H02N 1/00; H02N 1/08
(Continued)

(56) References Cited

U.S. PATENT DOCUMENTS

2009/0096323 A1*   4/2009   Minotti .................. H02N 1/008
                                                              310/323.02

FOREIGN PATENT DOCUMENTS

| EP | 2 177 960 A1 | 4/2010 |
| FR | 591217 A | 6/1925 |
| FR | 695379 A | 5/1930 |

* cited by examiner

*Primary Examiner* — Jose Gonzalez Quinones
(74) *Attorney, Agent, or Firm* — Blakely Sokoloff Taylor & Zafman LLP

(57) ABSTRACT

The invention relates to a device including: a movable element (1) comprising teeth (11; $11_i$, i, $11_{i+1}$, $11_{i+2}$, $11_{i+3}$, $11_{i+4}$); a driving element (2) for engaging with the teeth (11; $11_i$, $11_{i+1}$, $11_{i+2}$, $11_{i+3}$, $11_{i+4}$) of the movable element (1) so as to set the movable element (1) in motion in a direction of movement; an actuator element (3) capable of generating an alternating movement so as to move the driving element (2) according to at least two phases, i.e. a driving phase, during which the driving element (2) is engaged with a tooth (11; $11_i$, $11_{i+1}$, $11_{i+2}$, $11_{i+3}$, $11_{i+4}$) of the movable element (1), and a return phase without driving, during which the driving element (2) is shifted with respect to the movable element (1); and a first indexing element (4), which includes a first indexing finger (41) to be positioned between two teeth (11; $11_i$, $11_{i+1}$, $11_{i+2}$, $11_{i+3}$, $11_{i+4}$) of the movable element (1), and which is connected to the actuator element (3) in order to move the driving element (2) and the first indexing finger (41) simultaneously.

8 Claims, 7 Drawing Sheets

Figure 1:
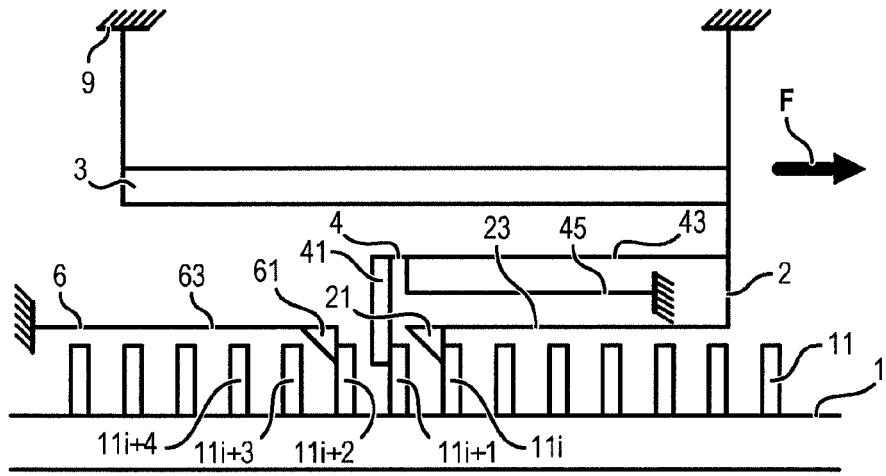

(51) Int. Cl.
*G06M 1/04* (2006.01)
*F16H 31/00* (2006.01)
*G04C 3/00* (2006.01)

(58) Field of Classification Search
USPC ................. 310/309, 323.02, 323.08, 323.09
See application file for complete search history.

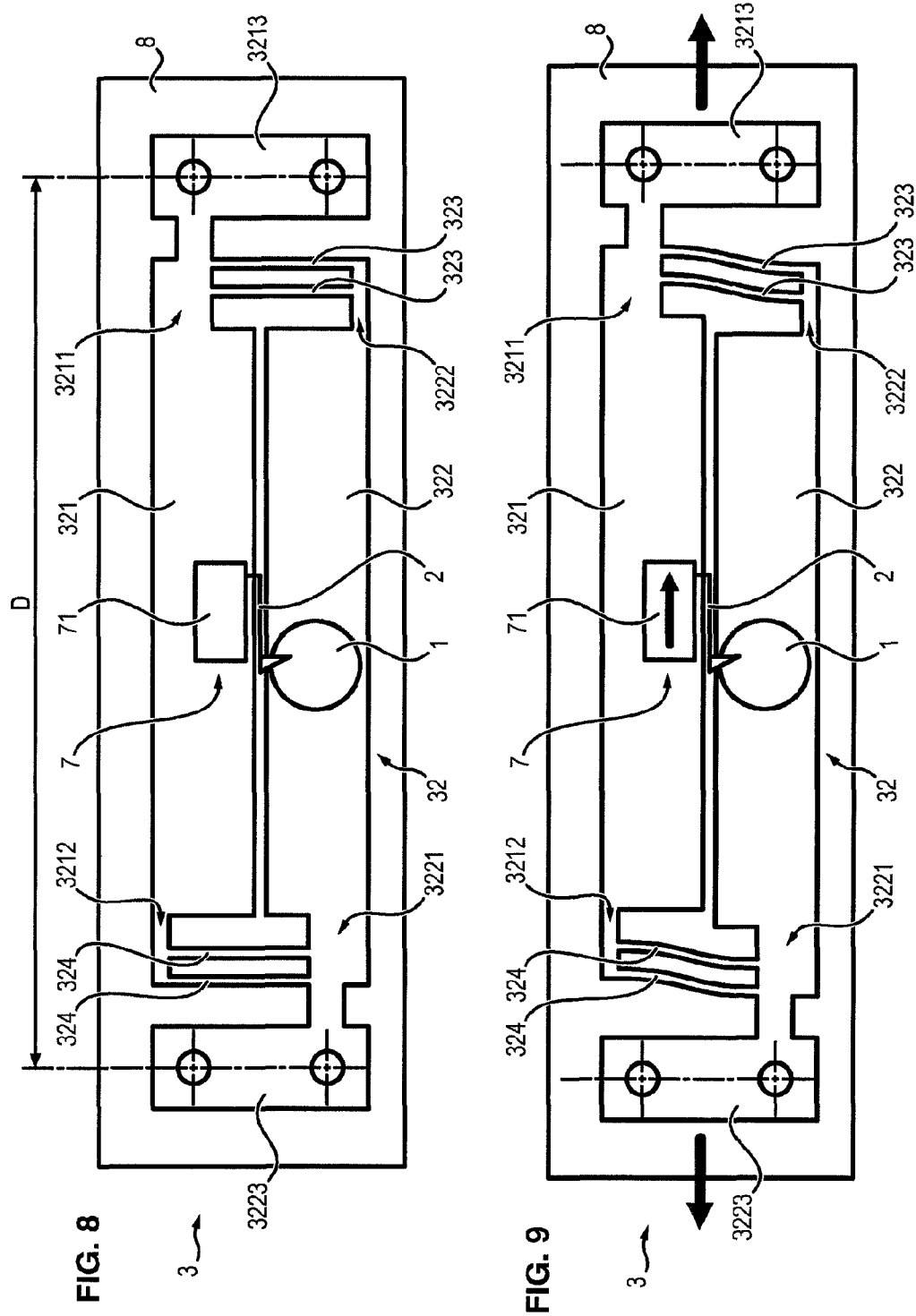

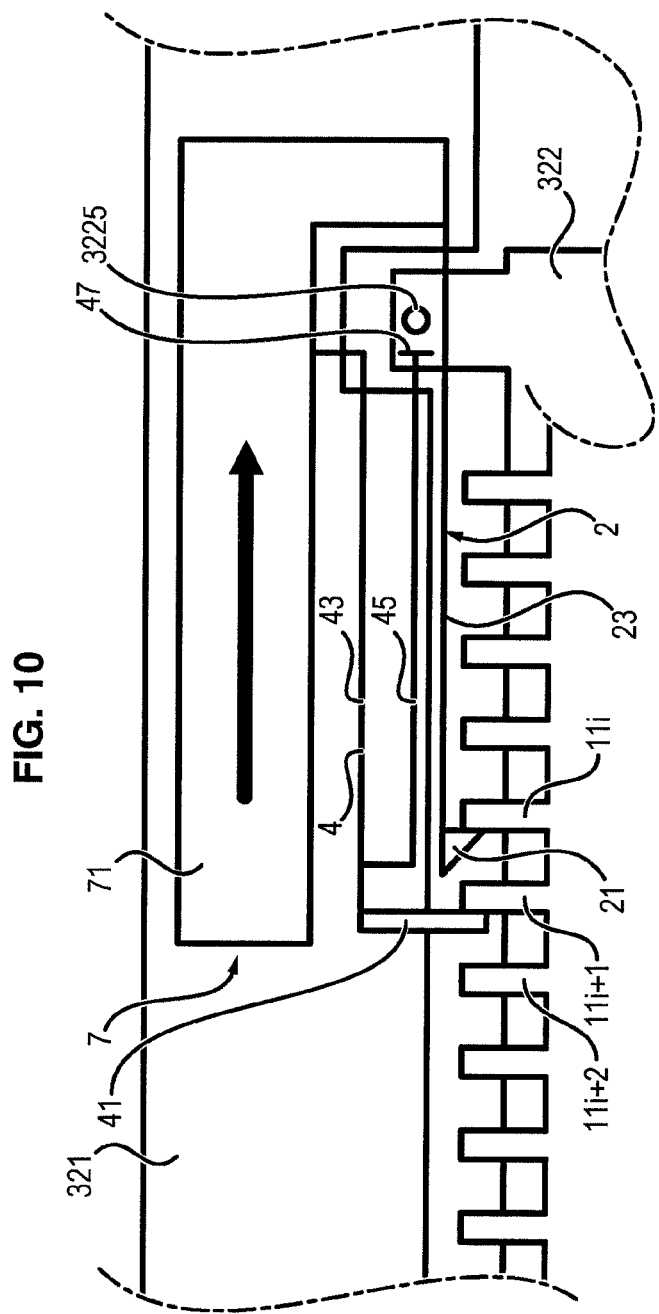

PASSIVE INDEXING OF A MOVABLE ELEMENT HAVING TEETH

TECHNICAL FIELD

The invention relates to the field of electromechanical microsystems (MEMS), and more particularly the locking of MEMS micromotors with microtoothed rotor (mobile element) dedicated to clock applications and scientific instrumentation as well as the locking of microsensors dedicated to detection and passive mechanical storage of MEMS structural deformations by means of the meshing of a toothed (mobile element) rotor (counter).

STATE OF THE ART

MEMS microtechnologies structure mechanical patterns of very small dimensions comparatively to conventional manufacturing technologies. They especially structure microtoothed rotors and/or counters which respectively have natural applications in the field of MEMS stepped micromotors of angular high resolution, and in the field of MEMS sensors dedicated to the health control of structures.

MEMS micromotors of angular (or linear) high resolution have applications in quartz watches and in scientific instrumentation for applications needing a high degree of positioning precision. This technology takes advantage of the potential of material microstructuring (i.e. micrometric teeth).

These micromotors also have the advantage of developing motor forces much greater than for devices of the prior art using the LAVET motor as drive member. The characteristics in charge of MEMS micromotors ensure direct drive of the mechanical load (needles . . . ) without the need for cogs responsible for boosting motor torque by speed reduction.

Abandoning speed-reducing cogs is conducive to improvement in output of the kinematic chain and consecutively to improvement in energetic autonomy. However, direct or quasi-direct drive of the mechanical load mounted directly on the rotor (mobile element) causes inadvertent unlocking risks of the rotor when the watch undergoes shocks and/or parasite accelerations. This hazard does not exist in the case of the LAVET motor coupled to a speed reducer, as the irreversibility of the cogs ensures stability of the load (needles . . . ) in case of shock or parasite acceleration.

Passive MEMS microsensors dedicated to health control of structures also employ a passive counter for parasite mechanical or thermal events (shocks, deformation, dilation . . . ) taking the form of a microtoothed rotor. The operation principle consists of implanting a passive sensor (without power supply) in the surface of a structure undergoing mechanical or thermal stresses, then by means of the meshing of toothing logging the structural deformations undergone by the monitored structure.

Therefore, when a predefined deformation threshold is exceeded the monitored structure sends the sensor a deformation which is read and stored mechanically by the meshing of a tooth of the microtoothed counter. Naturally, the operating principle remains valid irrespective of the type of deformation undergone by the structure (traction, compression, flexion . . . ).

However, as in the case of MEMS micromotors, locking of the rotor (counter) during accidental acceleration must be ensured so that said counter discriminates the deformations to be logged and the shocks or parasite accelerations which must never contribute to jumping teeth on the counter.

In this context, the present invention relates to using mechanisms for locking a rotor of a MEMS step micromotor and/or locking a counter (i.e. sensor) likely to undergo parasite movements conducive to accidental deindexation of a microtoothed wheel.

PRESENTATION

The invention proposes a device comprising:
- a mobile element comprising teeth and intended to be set in motion;
- a drive element intended to engage with the teeth of the mobile element to set in motion the mobile element in a direction of displacement;
- an actuator element capable of generating alternative motion to shift the drive element in at least two phases, a driving phase and a return phase.

During the driving phase, the drive element is engaged with at least one tooth of the mobile element to push or pull the mobile element.

During the return phase without drive, the drive element is offset relative to the mobile element to be engaged with at least one other tooth of the mobile element.

The device also comprises a first indexing element. The first indexing element comprises a first indexing finger intended to be positioned intermittently in a space between two teeth of the mobile element to prevent uncontrolled displacement by the drive element in the direction of displacement of the mobile element and in the opposite direction.

The first indexing element is connected to the actuator element such that the actuator element simultaneously moves the drive element and the first indexing finger.

Therefore, passive locking of the mobile element is achieved.

During the driving phase, the first indexing finger can be shifted by the actuator element out of the space between the two teeth of the mobile element, whereas during the return phase the first indexing finger is positioned by the actuator element in another space between two other teeth of the mobile element.

In a particular embodiment, the actuator element can comprise a fixed part and a mobile part relative to the fixed part, the drive element and the indexing element being connected to the mobile part.

The first indexing element can comprise:
- a first beam comprising a first free end and a second end connected to the actuator element; and
- a second beam comprising a first free end and an end connected to a fixed chassis of the device.

The first beam and the second beam are connected to each other by their respective free ends such that displacement of the first beam driven by the actuator element causes flexion of the second beam the effect of which is to move the first indexing finger relative to the mobile element.

So as soon as the drive element is actuated, the latter causes simultaneous missing of the indexing finger responsible for passively locking the rotor in case of untimely shock undergone by the motor.

In another particular embodiment, the actuator element can comprise a plate extending in a longitudinal direction. The plate comprises two blades connected to each other by at least two flexible cross members and fixed on a support such that deformation by compression or traction of the support generates displacement of one blade relative to the other in a direction of displacement parallel to the longitudinal direction of the plate.

Each of the blades can comprise a proximal end and a distal end, and comprises at its proximal end a fixing element for fixing to the support. A flexible cross member connects the distal end of one blade to the proximal end of the other blade.

The device can also comprise a actuation base fixed to one of the blades, the mobile element being fixed in rotation on the other blade of the plate. The actuation base comprises a base of the actuation element and the indexing element.

The actuation element can comprise a beam which extends parallel to the direction of displacement of the blades and can have a driving tooth at its free end. The indexing element comprises a first beam extending parallel to the direction of displacement of the blades and having at its free end an indexing finger and a second beam extending parallel to the direction of displacement of the blades from the free end of the first beam and in the opposite direction, and bearing at its free end a contact surface. The second blade comprises a stop intended to be contacted by the contact surface during setting in motion of the blades relative to each other to move the first indexing finger away from the mobile element.

This device passively locks the counter of a MEMS microsensor used in monitoring deformations undergone by a structure.

PRESENTATION OF THE DRAWINGS

Figure 11:
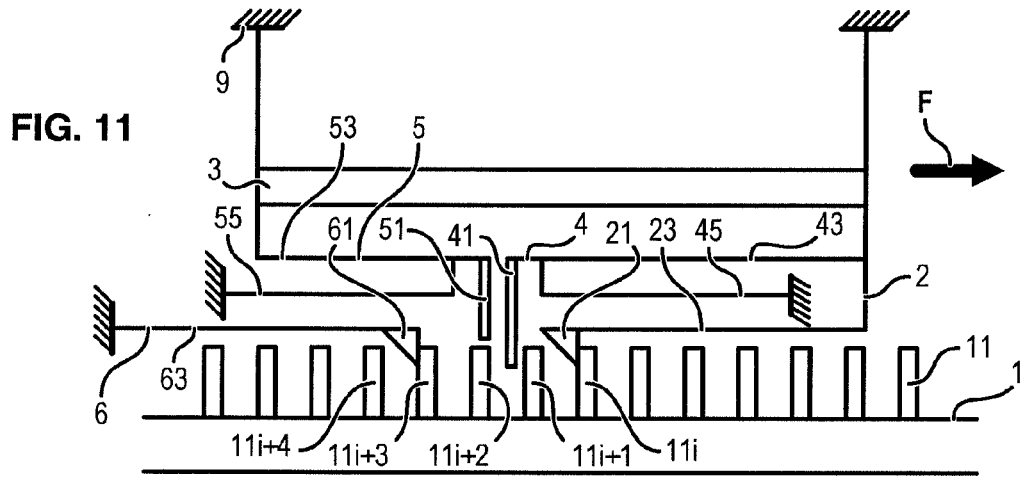

Other characteristics, aims and advantages will emerge from the following description in reference to the drawings given by way of illustration and non-limiting, in which:

FIG. 1 schematically illustrates a first embodiment of a device with a single indexing element in its initial position;

FIGS. 2 to 5 schematically illustrates the device of FIG. 1 in different positions during its operation;

FIGS. 6 to 10 schematically illustrate a second embodiment of a device with a single indexing element;

FIG. 11 schematically illustrates a third embodiment of a device with two indexer elements in its initial position;

FIGS. 12 to 15 schematically illustrate the device of FIG. 11 in different positions during its operation.

DETAILED DESCRIPTION

Device with a Single Indexing Element

A device with a single indexing element is described hereinbelow in reference to FIGS. 1 to 10.

The device comprises a mobile element 1 comprising teeth 11 and intended to be set in motion, and a drive element 2 intended to engage with the teeth 11 of the mobile element 1 to set in motion the mobile element 1 in a direction of displacement.

The device also comprises an actuator element 3 capable of generating an alternating movement for moving the drive element 2.

The device also comprises an indexing element 4 having an indexing finger 41 intended to be positioned intermittently in a space between two teeth 11 of the mobile element 1 to prevent any parasite displacement (that is, unwanted) of the mobile element 1 when the actuator element is at rest.

The indexing element 4 is connected to the actuator element 3 such that the actuator element 3 simultaneously shifts the drive element 2 and the indexing finger 41.

Generation of the alternative movement comprises at least two phases: a driving phase and a return phase.

During the driving phase, the drive element 2 is engaged with at least one tooth 11 of the mobile element to push or pull the mobile element 1.

For example, the indexing finger 41 is shifted by the actuator element 3 out of the space between the two teeth 11 of the mobile element 1.

During the return phase without driving, the drive element 2 is offset relative to the mobile element 1 to be engaged with at least one other tooth 11 of the mobile element 1.

For example, the indexing finger 41 is positioned by the actuator element 3 in another space between two other teeth 11 of the mobile element 1.

The device can also comprise a non-return element 6 to prevent displacement of the mobile element 1 in the direction opposite the direction of displacement of the mobile element 1 by the drive element 2. This non-return element 6 can be a brake exerting a friction force calibrated so that displacement of the mobile element 1 by the driving tooth in the direction of displacement is possible, whereas displacement of the mobile element 1 in the opposite direction is prevented. The brake is located for example on the axis of a rotor constituting the mobile element.

The non-return element can also be an element with a non-return finger. In this case, the non-return element 6 can comprise a beam 63 fitted with a non-return tooth 61. The non-return tooth 61 is placed between two teeth and is adapted to slide on the teeth when the latter move in the direction of displacement of the mobile element 1 and to block the teeth 11 when the latter move in the direction opposite the direction of displacement of the mobile element 1.

Such a design of the non-return element 6 is well known to those skilled in the art and will not be described in detail here.

Device with Comb-Drive Structure

A first example is described hereinbelow in reference to FIG. 1.

This device example comprises an actuator element of the type of that described in document FR 2 874 907.

The actuator element 3 comprises a fixed part and a mobile part. The fixed and mobile parts together form a comb-drive structure.

The comb-drive structure typically comprises two combs whereof the teeth are separated by a single distance greater than their thickness. The teeth of a first comb are placed between the teeth of the second comb.

When voltage is applied between the two combs, electrostatic forces are generated tend to move the teeth of one comb more closely to those of the other comb by interpenetration of the teeth of a comb between those of the other, causing an increase in coverage of the teeth of the two combs. When one of the combs is fixed the other is set in motion.

The drive element 2 comprises a beam 23 one end of which is connected to the mobile part of the comb-drive structure 3, and whereof the other end is connected to a driving tooth 21. During the driving phase, the driving tooth 21 is placed between two teeth 11 of the mobile element 1. When the mobile part of the comb-drive structure 3 moves, the latter also moves the driving tooth 21 in the direction of displacement of the mobile element 1. The driving tooth 21 pushes or pulls the mobile element 1 via one of the teeth 11 between which the driving tooth 21 is located.

The drive element 2 can be connected to the mobile part of the actuator element 3. So when the mobile part is set in motion, the drive element 2 is also set in motion.

The indexing element 4 can comprise two beams 43, 45. A first beam 43 comprises a first free end and a second end connected to the actuator element 3, for example by the mobile part.

A second beam 45 comprises a first free end and a second end connected to a fixed chassis 9 of the device.

The first and second beams 43, 45 are connected to each other by their free end.

So, displacement of the first beam 43 driven by the actuator element 3 causes flexion of the second beam 45, the effect of which is to move the indexing finger 41 relative to the mobile element 1.

At the start of the driving phase, the indexing finger 41 of the indexing element 4 is placed in a space between two teeth 11 of the mobile element 1. During the driving phase, the indexing finger 41 of the indexing element 4 is shifted by the actuator element 3 out of the space between the two teeth 11 of the mobile element 1 to set in motion the mobile element 1.

The return phase then follows, during which the indexing finger 41 is positioned by the actuator element 3 in another space between two other teeth of the mobile element 1.

In general, if the teeth 11 of the mobile element 1 are numbered $11_1, 11_2, \ldots 11_i, 11_{i+1}, 11_{i+2} \ldots$, and at the start of the driving phase if the indexing finger 41 is placed in the space between the teeth $11_{i+1}$ and $11_{i+2}$, then the latter is shifted out of these teeth to then be placed in the space between the teeth $11_{i+2}$ and $11_{i+3}$ during the return phase.

Operation of the Device with a Single Indexing Element with a Comb-Drive Structure Operation of the device with a single indexing element with comb-drive structure is described hereinbelow in reference to FIGS. 1 to 5.

Operation of the device is illustrated here by a device comprising a toothed wheel as mobile element 1. The initial position is understood as the position in which there is no electric voltage applied between the interdigital combs of the actuator element 3. The direction of displacement of the mobile element 1 is indicated by arrow F.

In the initial position illustrated by FIG. 1, since no voltage is applied between the interdigital combs of the actuator element 3, the mobile part of the actuator element 3 is in a state of rest.

In this state of rest, the driving tooth 21 of the drive element 2 is positioned in the space located between the two teeth $11_i$ and $11_{i+1}$ of the mobile element 1.

The indexing finger 41 of the indexing element 4 is positioned in the space located between the two teeth $11_{i+1}$ and $11_{i+2}$. The indexing finger 41 prevents the mobile element 1 from moving uncontrollably in the direction of arrow F and in the opposite direction when the actuator element 3 is at rest, for example during a shock received by the device.

The non-return tooth 61 of the non-return element 6 is positioned in the space located between the teeth $11_{i+2}$ and $11_{i+3}$ of the mobile element 1.

Figure 2:
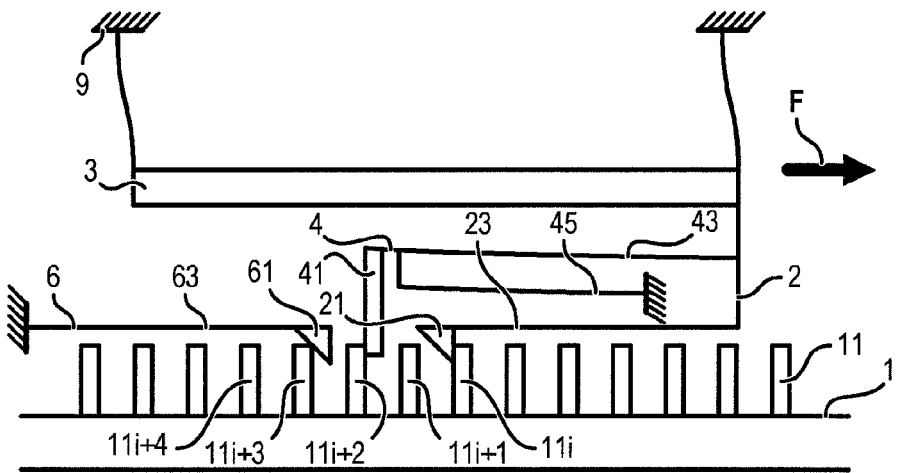

During the driving phase, the mobile part of the actuator element 3 is moved in the direction of arrow F. Since the drive element 2 is connected directly to the mobile part of the actuator element 3, it moves in the direction of arrow F also and comes into contact with the tooth $11_i$ of the mobile element 1, as shown in FIG. 2. During this time, the second beam 45 of the indexing element 4 starts to bend and lifts the indexing finger 41.

Figure 3:
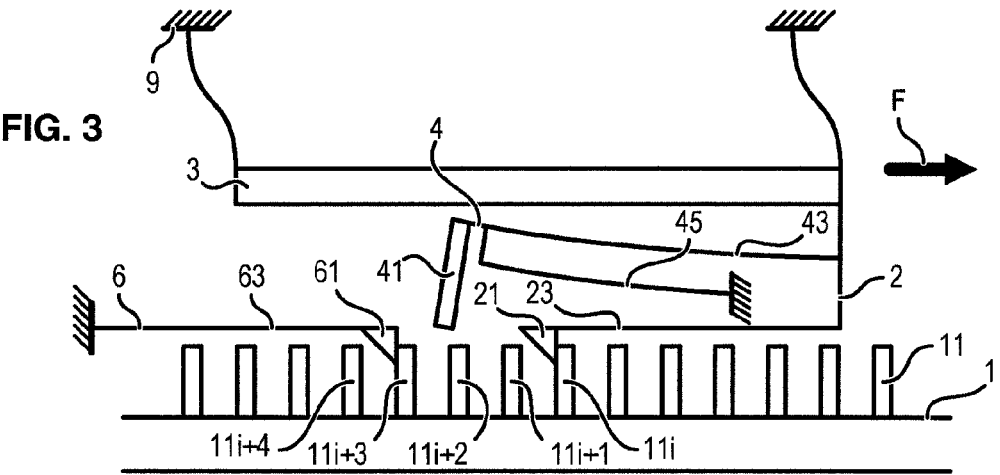
Figure 4:
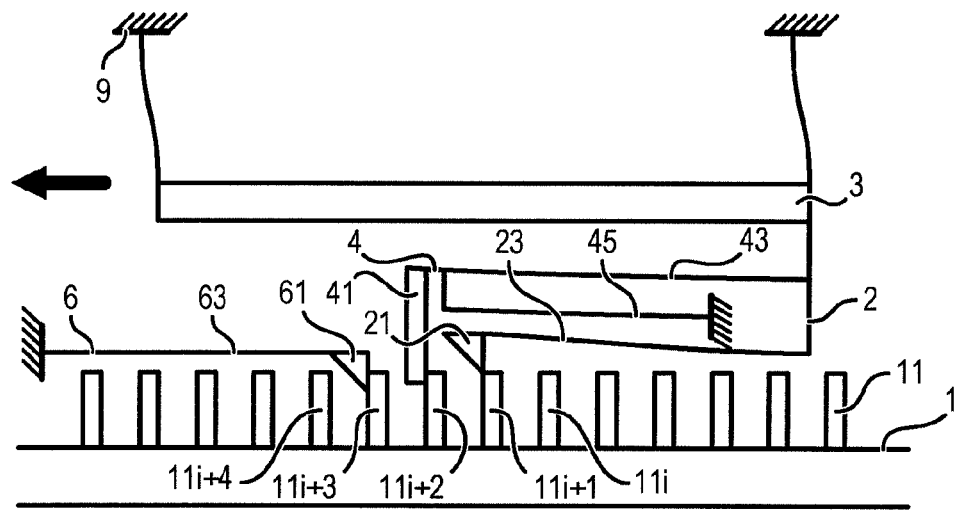
Figure 5:
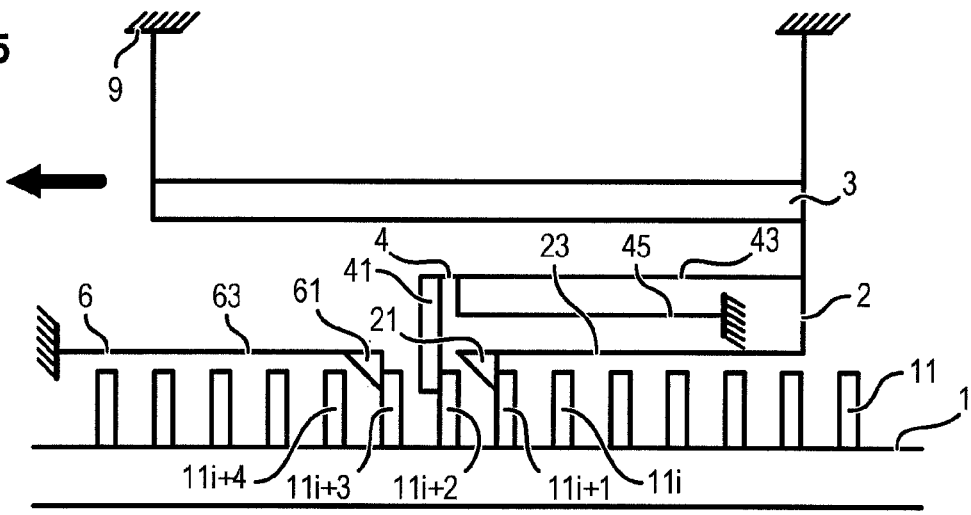

In FIG. 3, the mobile part of the actuator element 3 moves more in the direction of arrow F causing displacement of the indexing finger 41 of the indexing element 4 out of the teeth $11_{i+1}$ and $11_{i+2}$ of the mobile element 1 and setting in motion the mobile element 1. In fact, when the mobile part of the actuator element 3 moves more, the latter pulls on the first beam 43 of the indexing element 4 which is attached fixed to the second beam 45 of the indexing element 4 causing curving of the second beam 45 away from the teeth 11 of the mobile element 1.

Displacement of the mobile part of the actuator element 3 also causes driving of the mobile element 1 by the thrust or the traction exerted by the driving tooth 21 of the drive element 2 on the tooth $11_i$ of the mobile element 1. Meanwhile, the tooth $11_{i+3}$ of the mobile element 1 slides under the non-return tooth 61 of the non-return element 6.

During the return phase (FIG. 4), there is no more voltage applied between the interdigital combs of the actuator element 3, and the mobile part of the actuator element 3 returns to its start position.

When the mobile part of the actuator element 3 returns to its start position, the indexing finger 41 of the indexing element 4 is positioned in the space located between the teeth $11_{i+2}$ and $11_{i+3}$ of the mobile element 1. At the same time, the driving tooth 21 of the drive element 2 slides on the tooth $11_{i+1}$, while the non-return tooth 61 prevents movement of the mobile element 1 in the direction opposite the direction of arrow F by stop with the tooth $11_{i+3}$.

On completion of the return phase (FIG. 5), all the elements of the device are back in the same position as in the initial position (FIG. 1) with incrementation of teeth of the mobile element 1 of 1.

Device with a Single Indexing Element with a Fixed Plate on a Deformable Support A second example is described hereinbelow in reference to FIGS. 6 to 10.

In this example, the actuator element 3 is a plate 32 fixed on a deformable support 8. The plate 32 follows the deformations applied and undergone by the deformable support 8. The plate 32 comprises a centre of symmetry. The plate 32 comprises flexible two blades 321, 322 extending longitudinally and connected to each other by at least two cross members 323, 324 (four in FIGS. 6 to 10) arranged on either side of the centre of symmetry of the plate 32. Each of the two blades 321, 322 is also fixed on the deformable support 8 by a fixing element 3213, 3223 positioned at one of its ends.

For descriptive reasons, the end (or even the adjoining zone) closest to the fixing element will be called the proximal end 3211, 3221 hereinbelow. Similarly, the end (or even the adjoining zone) farthest from the fixing element will be called the distal end 3212, 3222 hereinbelow.

The two blades 321, 322 are connected to each other by the four flexible cross members 323, 324 such that a pair of cross members 323 connects the proximal end 3211 of a first blade 321 to the distal end 3222 of the second blade 322 and another pair of cross members 324 connects the distal end 3212 of the first blade 321 to the proximal end 3221 of the second blade 322. The plate 32 forms a mechanical oscillator which reacts to the deformations by compression, traction or flexion of the support 8.

When deformation by compression or traction parallel to the extension of the plate 32 is applied to the deformable support 8, the plate 32 also undergoes deformation by compression or traction and the two blades 321, 322 are moved relative to each other in translation along a direction of displacement parallel to their longitudinal extension. If the deformation applied is compression, the two blades 321, 322 are moved so that their distal ends 3212, 3222 move away from each other. Inversely, if the deformation applied is traction, the two blades 321, 322 are moved so that their distal ends 3212, 3222 move towards each other.

The amplitude of the relative displacement of one blade 321 relative to the other 322 depends on the distance D separating the fixing elements 3213 and 3223 from each other.

In this variant, an actuation base 7 is mounted mobile on the first blade 321 and the mobile element 1 is mounted in rotation on the second blade 322.

The actuation base 7 comprises a base 71, the actuation element 2 and the indexing element 4.

The actuation element 2 comprises a beam 23 which extends parallel to the direction of displacement of the blades and has a driving tooth 21 at its free end.

The indexing element 4 comprises a first beam 43 which extends parallel to the direction of displacement of the blades and has at its free end an indexing finger 41. A second beam 45 extends parallel to the direction of displacement of the blades from the free end of the first beam 43 and in the opposite direction and bears a contact surface 47 on its free end.

The second blade 322 comprises a stop 3225 contacted by the contact surface 47 when the two blades 321, 322 are set in motion relative to each other. The distance separating the contact surface 47 and the stop 3225 in the rest position of the device is selected, relative to the space between the teeth 11 of the mobile element 1, the width of the indexing finger 41 and the initial play between the driving tooth 21 and the tooth to be driven of the mobile element 1, such that displacement of the indexer finger 41 out of the space separating two teeth 11 of the mobile element 1 occurs before the driving tooth 21 has shifted the mobile element 1 by a complete step.

The device can also comprise a non-return element (not shown).

This device is used advantageously for monitoring a structure undergoing forces of compression, traction and/or flexion.

For example, this device can be fixed on a bridge pier, the pier forming the support 8. The pitch of the teeth 11 of the mobile element 1 is selected so as to allow monitoring of deformations by compression undergone by the pier (and therefore by the bridge) of a given amplitude. For example, if the pitch of the teeth 11 of the mobile element 1 is 10 µm, the minimal deformation to be detected has an amplitude of 10 µm. When a load is applied to the bridge (vehicles passing over), the pier undergoes deformation by compression. When this load is high enough to deform the pier by compression by at least 10 µm then the actuator element 3 acts on the mobile element 1 via the actuation element 2 to move the mobile element 1 by a pitch of 10 µm.

Another example is when this device can be fixed to a crane cable stressed by traction, the cable forming the support 8. The pitch of the teeth 11 of the mobile element 1 is selected to allow monitoring of the deformations by traction undergone by the cable by a given amplitude. For example, if the pitch of the teeth 11 of the mobile element 1 is 30 µm, the deformation to be detected has an amplitude of 30 µm. When a load is attached to the end of the crane cable, the cable undergoes deformation by traction. When this load is high enough to deform the cable by traction by at least 30 µm then the actuator element 3 acts on the mobile element 1 via the actuation element 2 to move the mobile element 1 by a pitch of 30 µm.

Operation of the Device with a Single Indexing Element with Plate Fixed on Deformable Support Operation of the device with a single indexing element with plate fixed on deformable support is described hereinbelow in reference to FIGS. 6 to 10.

In a first variant, the device is configured to monitor deformation by traction of the support 8 (see FIGS. 8, 9 and 10).

Operation of the device is illustrated here with a device comprising a toothed wheel as mobile element 1. The initial position is understood as the position in which there is no deformation generated on the deformable support. The direction of displacement of the mobile element 1 is indicated by arrow F.

In the initial position, since no deformation is generated on the deformable support, the flexible cross members 323, 324 of the actuator element 3 are in a state of rest.

In this state of rest, the driving tooth 21 of the drive element 2 is positioned in the space located between the two teeth $11_i$ and $11_{i+1}$ of the mobile element 1.

The indexing finger 41 of the indexing element 4 is positioned in the space located between the two teeth $11_{i+1}$ and $11_{i+2}$. The indexing finger 41 prevents the mobile element 1 from moving uncontrollably in the direction of arrow F and in the opposite direction, for example during a shock received by the device.

The non-return tooth of the non-return element (not shown in the drawings) is positioned in another space located between two teeth of the mobile element 1.

During the driving phase, a traction force is applied to the deformable support 8. The direction of the traction force is in the direction of displacement of the blades. The two blades 321, 322 move relative to each other so that their distal ends 3212, 3222 move more closely to each other.

The result of this relative movement is displacement of the base 71 in the direction of arrow F. As the drive element 2 is connected directly to the base 71, it also moves in the direction of arrow F and comes into contact with the tooth $11_i$ of the mobile element 1. Displacement of the drive element 2 then causes driving of the mobile element 1 by the thrust or traction exerted by the driving tooth 21 of the drive element 2 on the tooth $11_i$ of the mobile element 1. The amplitude of the displacement of the base 71 and of the mobile element 1 depends both on the deformation of the support 8 and the distance D separating the two fixing elements 3213, 3223.

During this time, the contact surface 47 of the indexing element 4 moves in the direction of the stop 3225 until there is contact. The stop 3225 restricts displacement of the contact surface 47, that is, of the free end of the second beam 45 of the indexing element 4. The first and second beams 43, 45 of the indexing element 4 deform by bending and accordingly lift the indexing finger 41 out of the space between the teeth $11_{i+1}$ and $11_{i+2}$ of the mobile element 1.

At the same time, if the non-return element comprises a non-return tooth, a tooth of the mobile element 1 slides under the non-return tooth of the non-return element. During the return phase, the traction force on the deformable support 8 is cancelled. The two blades 321, 322 move relatively to each other so that their distal ends 3212, 3222 move away from each other to return to the rest position.

The result of this relative movement is displacement of the base 71 in the opposite direction to that of arrow F. Since the drive element 2 is connected directly to the base 71, it moves also in the opposite direction to that of arrow F and comes into contact with the tooth $11_{i+1}$ of the mobile element 1, slides over the latter to position itself between the teeth and $11_{i+1}$ and $11_{i+2}$ During this time, the first and second beams 43, of the indexing element 4 return to the rest position, lessening their curve, which causes lowering of the indexing finger 41 and its insertion between two new teeth of the mobile element 1. The return to their linear form coincides with the contact surface 47 coming out of contact with the stop 3225. When the beams 43, 45 of the indexing element 4 have returned to their rest position, the indexing finger 41 is placed between two new teeth of the mobile element 1. The indexing element 4 continues its course parallel to the direction of displacement of the blades, until it reaches the rest position of the device at the end of the return phase.

The non-return element prevents movement of the mobile element 1 in the direction opposite the direction of arrow F by stop with a tooth of the mobile element 1. At the end of the return phase, all the elements of the device are back in the same position as in the initial position with incrementation of teeth of the mobile element 1 of 1.

Figures 6, 7:
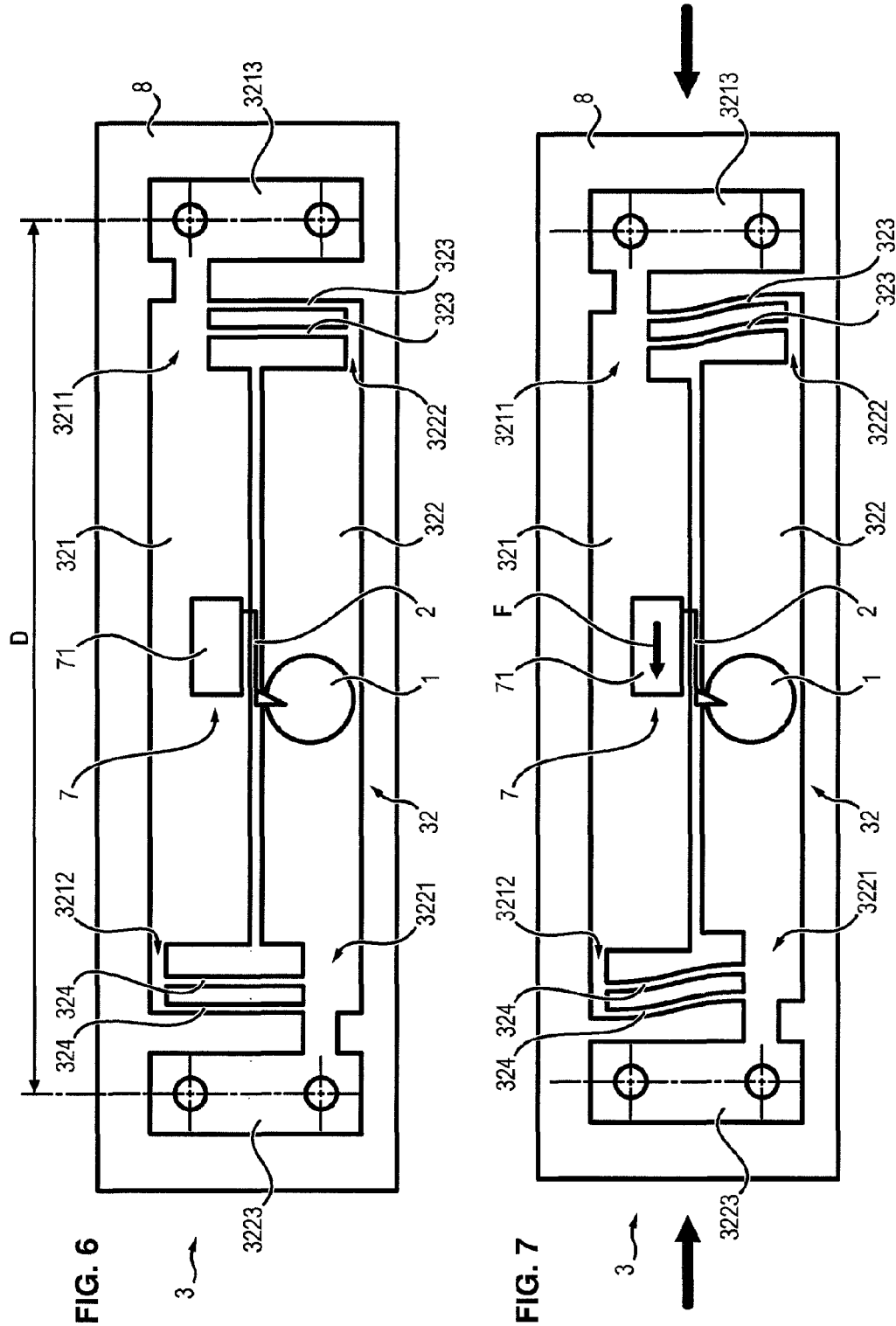

A second variant is possible for monitoring deformation by compression of the support 8 (see FIGS. 6 and 7). Those skilled in the art can adapt the description above, and especially the position of the different elements and their geometry for driving a mobile element 1, especially the geometry of the actuation tooth.

Also, the present invention is not limited to these two variants described hereinabove. In fact, those skilled in the art can adapt the description to enable monitoring of deformation by flexion of the support 8 so that such deformation generates displacement of the mobile element 1.

Device with Two Indexer Elements

The device with two indexer elements is identical to the device with a single indexing element with comb-drive structure described hereinabove. The additional elements are described hereinbelow in reference to FIG. 11.

This device with two indexer elements comprises also a second indexing element 5 comprising a second indexing finger 51 intended to be positioned intermittently between two teeth 11 of the mobile element, to prevent uncontrolled movement by the drive element 2 of the mobile element 1 in the direction of its displacement during the displacement phase. The second indexing finger 51 of the second indexing element 5 is shifted in phase opposition relative to the first indexing finger 41 of the first indexing element 4.

At the start of the driving phase, the second indexing finger 51 is taken out of the teeth 11 of the mobile element 1. During the driving phase, the second indexing finger 51 is shifted to be positioned in the space between two teeth 11 of the mobile element 1, for example in the space between the two other teeth 11 of the mobile element 1 in which the first indexing finger 41 will be positioned during the return phase.

During the return phase, the second indexing finger 51 is shifted out of the space between the two teeth 11 of the mobile element 1, and preferably the second indexing finger 51 leaves room for the first indexing finger 41.

The second indexing element 5 can be connected to the actuator element 3 such that the actuator element 3 moves simultaneously the drive element 2 and the second indexing finger 51.

The second indexing element 5 can, by example, be connected to the mobile part of the actuator element 3. Therefore when the mobile part is set in motion, the drive element 2, the first indexing element 4 and the second indexing element 5 are simultaneously set in motion.

The second indexer 5 can comprise two beams 53, 55. A first beam 53 comprises a first free end and a second end connected to the actuator element 3, for example by the mobile part.

A second beam 55 comprises a first free end and a second end connected to the fixed chassis 9 of the device.

The first and second beams 53, 55 are connected to each other by their free end.

Therefore displacement of the first beam 53 driven by the actuator element 3 causes flexion of the second beam 55, the effect of which is to move the second indexing finger 51 relative to the mobile element 1.

Operation of the Device with Two Indexer Elements

Operation of the device with two indexer elements is described hereinbelow in reference to FIGS. 11 to 15.

Operation of the device is illustrated here with a device comprising a toothed wheel as mobile element 1 and a comb-drive structure as actuator element 3. The initial position is understood as the position in which there is no voltage applied between the interdigital combs of the actuator element 3. The direction of displacement of the mobile element 1 is indicated by arrow F and in the opposite direction when the actuator element 3 is at rest.

In the initial position illustrated by FIG. 11, since no voltage is applied between the interdigital combs of the actuator element 3, the mobile part of the actuator element 3 is in a state of rest.

In this state of rest, the driving tooth 21 of the drive element 2 is positioned in the space located between the two teeth $11_i$ and $11_{i+1}$ of the mobile element 1.

The first indexing finger 41 of the first indexing element 4 is positioned in the space located between the two teeth $11_{i+1}$ and $11_{i+2}$. The first indexing finger prevents the mobile element 1 from moving uncontrollably in the direction of arrow F.

The second indexing finger 51 of the second indexing element 5 is positioned out of the teeth 11 of the mobile element 1.

The non-return tooth 61 of the non-return element 6 is positioned in the space located between the teeth $11_{i+3}$ and $11_{i+4}$ of the mobile element 1.

Figure 12:
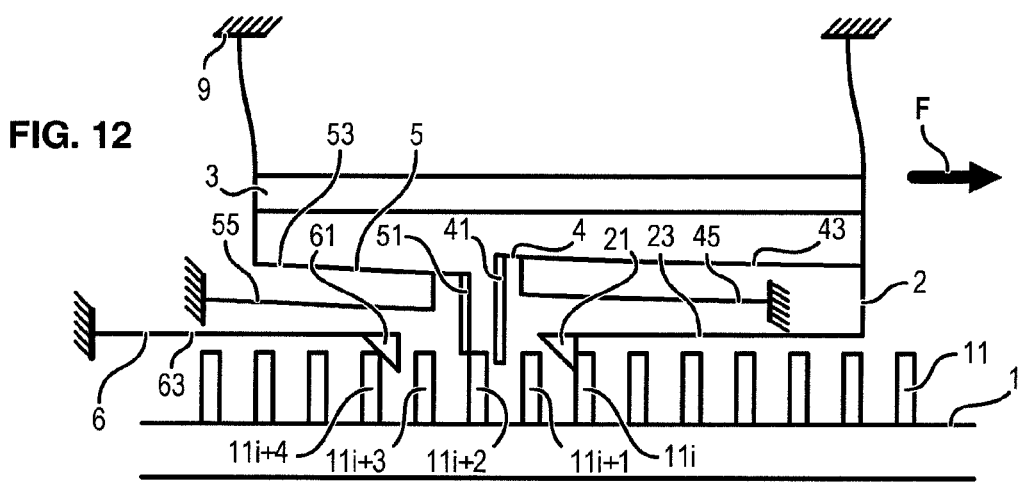

During the drive phase the mobile part of the actuator element 3 is displaced in the direction of arrow F. As the drive element 2 is connected directly to the mobile part of the actuator element 3, it also moves in the direction of arrow F and comes into contact with the tooth $11_i$ of the mobile element 1 as shown in FIG. 12. During this time, the second beam 45 of the first indexing element 4 starts to bend and lifts the first indexing finger 41.

Figure 13:
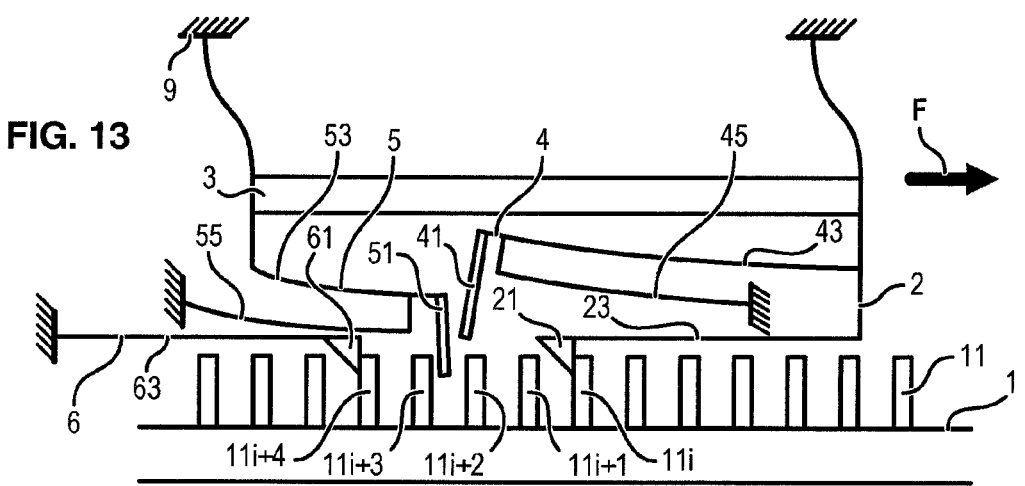
Figure 14:
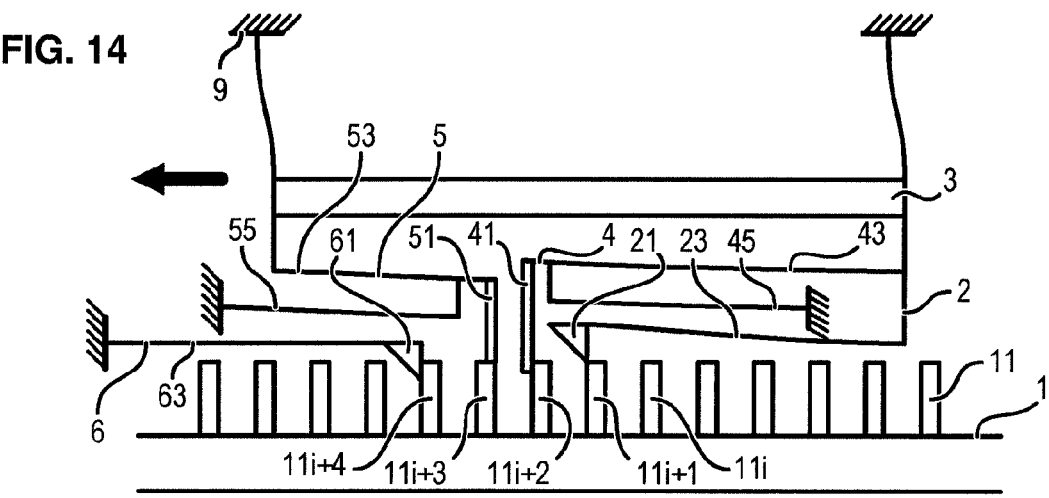
Figure 15:
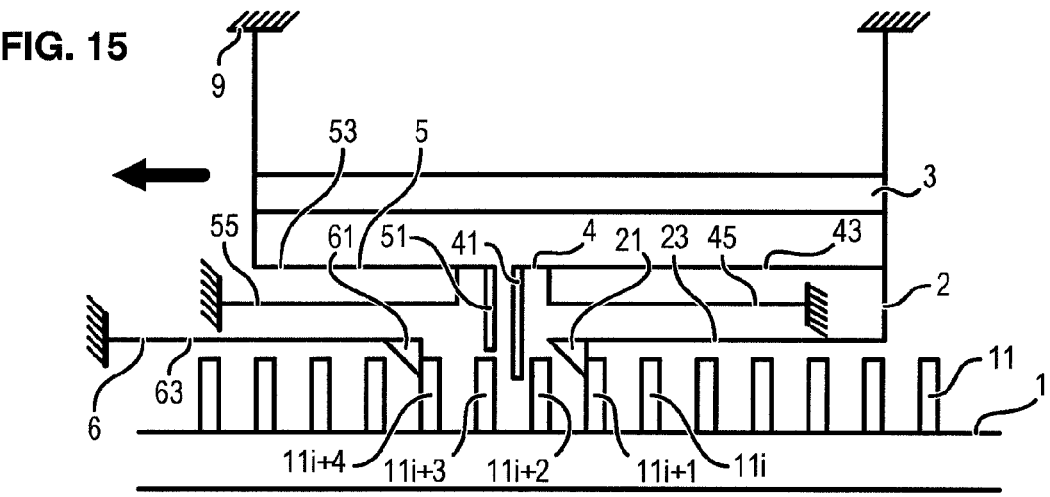

In FIG. 13, the mobile part of the actuator element 3 moves more in the direction of arrow F causing displacement of the first indexing finger 41 of the first indexing element 4 out of the teeth $11_{i+1}$ and $11_{i+2}$ of the mobile element 1 setting in motion the mobile element 1.

During this time, displacement of the mobile part of the actuator element 3 in the direction of arrow F also causes displacement of the second indexing finger 51 of the second indexing element 5 to place it between the teeth $11_{i+2}$ and $11_{i+3}$. The second indexing finger 51 controls rotation of the mobile element 1 by allowing displacement of the latter only by a single tooth in the direction of arrow F. If the mobile element 1 tends to move more, the second indexing finger 51 stops against the tooth $11_{i+3}$.

The displacements of the first and second indexing fingers 41 and 51 are in phase opposition. This is made possible in the example illustrated by FIGS. 11 to 15 due to direct fixing of the first beam 43 of the first indexing element 4 to the mobile part of the actuator element 3 on an edge located on the same side as the point of arrow F, to direct fixing of the first beam 53 of the second indexing element 5 to the mobile part of the actuator element 3 on an edge positioned on the side opposite the point of arrow F, and to fixed bonding of the second beams 45 and 55 to the chassis 9 and the respective first beams 43 and 53.

Therefore, when the mobile part of the actuator element 3 moves according to the direction of arrow F, it drives the first beams 43 and 53 in its movement. The beams of the indexer elements 4 and 5 bend due to the moments of flexion generated by the lever arm connecting the beams 43, 45 and 53, 55:

- the beams of the first indexing element 4 away from the teeth 11 of the mobile element 1; and
- the beams of the second indexing element 5 towards the teeth 11 of the mobile element 1.

The displacement of the mobile part of the actuator element 3 also causes driving of the mobile element 1 by thrust or traction exerted by the driving tooth 21 of the drive element 2 on the tooth $11_i$ of the mobile element 1. Meanwhile, the tooth $11_{i+4}$ of the mobile element 1 slides under the non-return tooth 61 of the non-return element 6.

During the return phase (FIG. 14), there is no more voltage applied between the interdigital combs of the actuator element 3, and the mobile part of the actuator element 3 returns to its start position.

When the mobile part of the actuator element 3 returns to its start position, the first indexing finger 41 of the first indexing element 4 is positioned in the space located between the teeth $11_{i+2}$ and $11_{i+3}$ of the mobile element 1. At the same time, the driving tooth 21 of the drive element 2 slides on the tooth $11_{i+1}$, and the second indexing finger 51 of the second indexing element 5 is shifted away from the teeth 11 of the mobile element 1, while the non-return tooth 61 prevents movement of the mobile element 1 in the direction opposite the direction of arrow F by stop with the tooth $11_{i+4}$.

On completion of the return phase (FIG. 15), all the elements of the device are at the same position as in the initial position (FIG. 11) with incrementation of the teeth of the mobile element 1 of 1.

The invention claimed is:

1. A device comprising:
   a mobile element (1) comprising teeth (11; $11_i$; $11_{i+1}$, $11_{i+2}$, $11_{i+3}$, $11_{i+4}$) and intended to be set in motion;
   a drive element (2) intended to engage with the teeth (11; $11_i$, $11_{i+1}$, $11_{i+2}$, $11_{i+3}$, $11_{i+4}$) of the mobile element (1) to set in motion the mobile element (1) in a direction of displacement;
   an actuator element (3) connected to the drive element (2) capable of generating alternative motion to shift the drive element (2) in at least two phases, a driving phase and a return phase,
   during the driving phase, the drive element (2) is engaged with at least one tooth (11; $11_i$, $11_{i+1}$, $11_{i+2}$, $11_{i+3}$, $11_{i+4}$) of the mobile element (1) to push or pull the mobile element (1), during the return phase without driving, the drive element (2) is offset relative to the mobile element (1) to be engaged with at least one other tooth (11; $11_i$, $11_{i+1}$, $11_{i+2}$, $11_{i+3}$, $11_{i+4}$) of the mobile element (1),
   a first indexing element (4) comprising a first indexing finger (41) intended to be positioned intermittently in a space between two teeth (11; $11_i$, $11_{i+2}$, $11_{i+3}$, $11_{i+4}$) of the mobile element (1) to prevent uncontrolled displacement by the drive element in the direction of displacement of the mobile element (1) or in the opposite direction; and
   characterised in that the first indexing element (4) is connected to the actuator element (3) such that the actuator element (3) simultaneously shifts the drive element (2) and the first indexing finger (41).

2. The device according to claim 1, wherein
   during the driving phase, the first indexing finger (41) is shifted by the actuator element (3) out of the space between the two teeth (11; $11_i$, $11_{i+1}$, $11_{i+2}$, $11_{i+3}$, $11_{i+4}$) of the mobile element (1); and
   during the return phase, the first indexing finger (41) is positioned by the actuator element (3) in another space between two other teeth (11; $11_i$, $11_{i+1}$, $11_{i+2}$, $11_{i+3}$, $11_{i+4}$) of the mobile element (1).

3. The device according to claim 1 or 2, wherein the actuator element (2) comprises a fixed part and a mobile part relative to the fixed part, the drive element (3) and the indexing element (4) being connected to the mobile part.

4. The device according to claim 3, wherein the first indexing element (4) comprises:
   a first beam (43) comprising a first free end and a second end connected to the actuator element (3); and
   a second beam (45) comprising a first free end and an end connected to a fixed chassis (9) of the device;
   the first beam (43) and the second beam (45) being connected to each other by their respective free ends such that displacement of the first beam (43) driven by the actuator element (3) causes flexion of the second beam (45), the effect of which is to move the first indexing finger (41) relative to the mobile element (1).

5. The device according to claim 1, further comprising a second indexing element (5) comprising a second indexing finger (51) intended to be positioned intermittently between two teeth (11; $11_i$, $11_{i+1}$, $11_{i+2}$, $11_{i+3}$, $11_{i+4}$) of the mobile element (1), the second indexing finger (51) being shifted in phase opposition with the first indexing finger (41).

6. The device according to claim 5, wherein
   during the driving phase, the second indexing finger (51) is positioned in the space between the two other teeth (11; $11_i$, $11_{i+1}$, $11_{i+2}$, $11_{i+3}$, $11_{i+4}$) of the mobile element (1), wherein the first indexing finger (41) will be positioned during the return phase; and
   during the return phase, the second indexing finger (51) is shifted out of the space between the two teeth (11; $11_i$, $11_{i+1}$, $11_{i+2}$, $11_{i+3}$, $11_{i+4}$) of the mobile element (1).

7. The device according to claim 5, wherein the second indexing element (5) is also connected to the actuator element (3) such that the actuator element (3) simultaneously moves the drive element (2) and the second indexing finger (5).

8. The device according to claim 7, wherein the second indexer (5) comprises:
   a first beam (53) comprising a first free end and a second end connected to the actuator element (3); and
   a second beam (55) comprising a first free end and an end connected to the fixed chassis (9) of the device;
   the first beam (53) and the second beam (55) being connected to each other by their free ends such that displacement of the first beam (53) driven by the actuator element (3) causes flexion of the second beam (55), the effect of which is to move the second indexing finger (51) relative to the mobile element (1).

* * * * *